POWER SAVING DEVICE

Filed Nov. 7, 1956

INVENTOR.
JOHN P. O'NEILL
BY
Charles H. Brown
ATTORNEY.

United States Patent Office 2,884,518

Patented Apr. 28, 1959

2,884,518

POWER SAVING DEVICE

John P. O'Neill, Fort Washington, Pa., assignor to Radio Corporation of America, a corporation of Delaware Application November 7, 1956, Serial No. 620,842

6 Claims. (Cl. 250—20)

The invention relates to power saving devices, and particularly to power saving devices for conserving battery power in transistorized radio receivers.

A general object of the invention is to provide an improved electronic power saving device for conserving power in electrical devices.

A more specific object of the invention is to provide an electronic power saving device that is especially useful in special, small, lightweight, portable transistorized radio receivers, such as the paging type; that intermittently energizes the radio receiver; and that may continuously energize the radio receiver if a predetermined signal is received during one of the intermittent energizing periods.

Briefly, the invention comprises a switching device for providing an electrical circuit that may be alternately opened and closed. The switching device may be connected between a power source, such as batteries for example, and a load device, such as a radio receiver for example. A pair of electron current flow control devices are regeneratively connected to form an astable (free running) multivibrator which is connected to the switching device. The switching device alternately opens and closes in response to the switching of the multivibrator, thus providing an electronic device for intermittently energizing the radio receiver. Control means may be coupled between the radio receiver and the multivibrator for maintaining the multivibrator in the particular switched condition which holds the switching device closed, thus providing a continuous electrical circuit for energizing the radio receiver. This control means may be activated by any suitable means, such as a predetermined control signal received by the receiver during one of the intermittent energizing periods.

The invention is explained in detail in connection with the accompanying drawing, in which.

Figures 1, 2, 3:
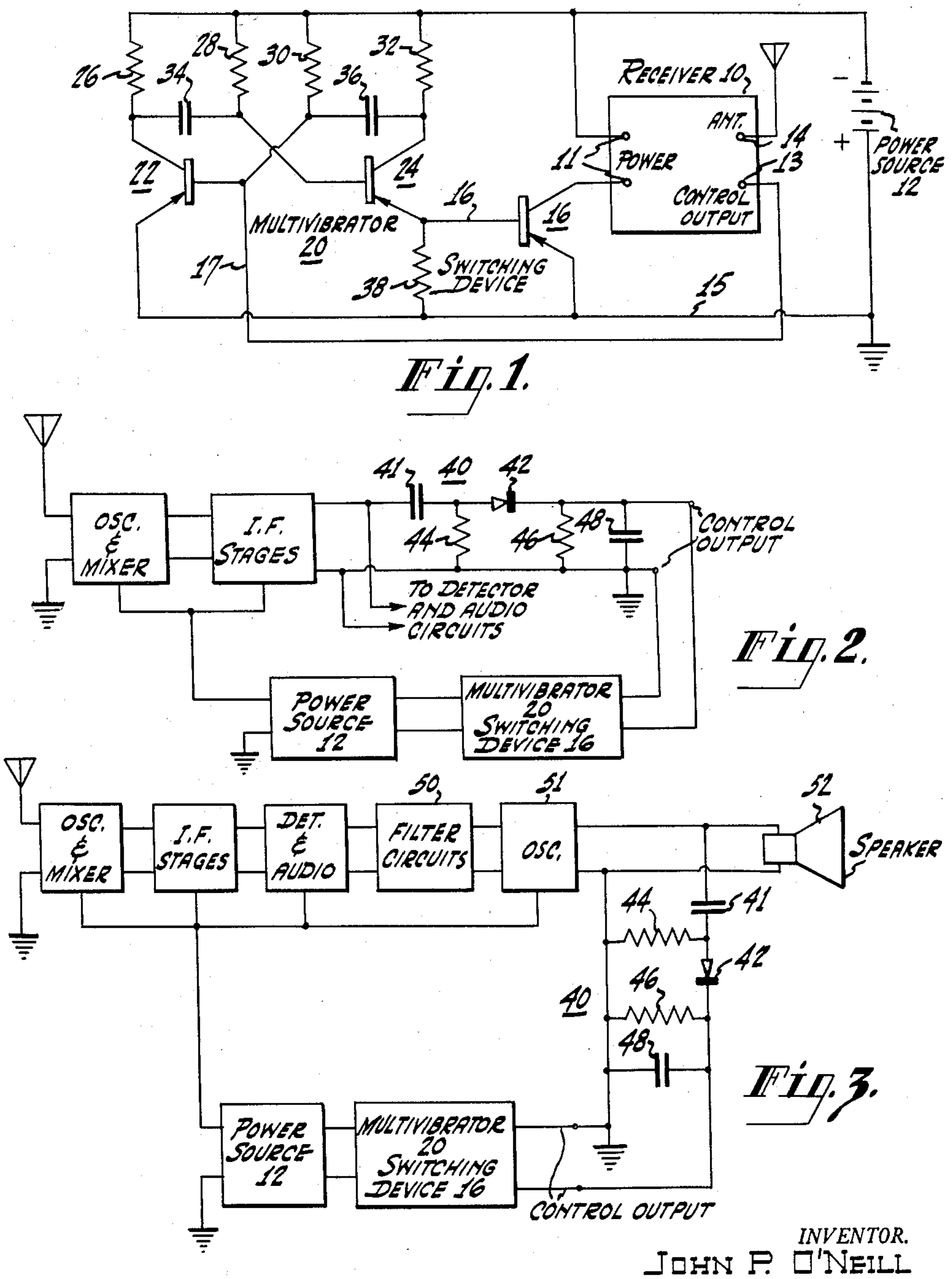
Figure 1 shows one embodiment of the invention for intermittently energizing a radio receiver with battery power in conjunction with means for supplying continuous battery power for the radio receiver.
Figure 2 shows one arrangement for deriving a control signal for the radio receiver.
Figure 3 shows another embodiment for deriving a control signal for the radio receiver.

In Figure 1, a radio receiver 10 is shown in block diagram. This receiver 10 may comprise any conventional receiver circuit having power input terminals 11, an antenna or receiving terminal 14, and a control output terminal 13. The control output terminal 13 derives a control signal whose function and purpose will be explained subsequently. Power for the receiver 10 is provided from a power source 12, such as the battery shown. The negative terminal of the battery is connected to one of the power terminals 11 of the receiver 10, and the positive terminal of the battery is connected to some point of reference potential, such as ground. The point of reference potential is connected to the receiver 10 over a lead 15 and thru a switching device 16, which in Figure 1 is shown as being a PNP-type transistor. The emitter of the switching transistor 16 is connected to the point of reference potential by the lead 15, and the collector of the switching transistor 16 is connected to the other power terminal 11 of the receiver 10. The switching transistor 16 is normally non-conducting, but is intermittently switched to the conducting or "on" condition by a multivibrator circuit 20. The multivibrator circuit 20 comprises a pair of PNP-type transistors 22, 24 which are regeneratively connected to form an astable or free-running multivibrator. The collectors of the transistors 22, 24 are connected to the negative terminal of the battery thru respective resistors 26, 32, and the bases of the transistors 22, 24 are also connected to the negative terminal of the battery thru the respective resistors 28, 30. A capacitor 34 is connected between the collector of one transistor 22 and the base of the other transistor 24, and a capacitor 36 is also connected between the collector of the other transistor 24 and the base of the one transistor 22. The emitter of the one transistor 22 is connected directly to the point of reference potential by way of the lead 15. The emitter of the other transistor 24 is connected to the point of reference potential thru a bias resistor 38, and is also connected directly by way of a lead 16 to the base of the switching transistor 16. The base of the one transistor 22 is connected to the control output terminal 13 of the receiver 10 by way of a lead 17.

When the multivibrator 20 is in operation, the two transistors 22, 24 are alternately conducting and non-conducting in a manner familiar to those skilled in the art. During the time the one transistor 22 is conducting, the other transistor 24 is non-conducting, and likewise during the time that the other transistor 24 is conducting, the one transistor 22 is non-conducting. When the other transistor 24 is conducting, its emitter becomes sufficiently negative by virtue of the voltage drop across the resistor 38 connected to its emitter, so that the base of the switching transistor 16 also becomes sufficiently negative to permit the normally non-conducting switching transistor 16 to conduct. When the switching transistor 16 is conducting, the voltage drop across it then becomes sufficiently low so that the point of reference potential appears effectively at the lower power terminal 11 of the receiver 10. Thus, power is connected to the receiver 10, and the receiver is energized during the time the switching transistor 16 is conducting. If, during the time the receiver 10 is energized, a predetermined signal is received, this signal may appear at the control output terminal 13 in the form of a positive D.C. control voltage. This positive D.C. control voltage is applied to the base of the one transistor 22, to cause the one transistor 22 to become non-conducting for the duration of the positive D.C. control voltage. During the duration when the one transistor 22 is cut-off, or non-conductive, the other transistor 24 remains in a continuously conducting state. While the other transistor 24 is in the continuously conducting state, the switching transistor 16 is also in a continuously conducting state, thus enabling the receiver 10 to be energized. When the control signal on the terminal 13 is removed or lost, the positive D.C. control voltage no longer appears at the base of the one transistor 22. The multivibrator 20 then begins its switching action again, thus intermittently energizing the receiver 10 in the manner previously described.

While the switching time of the multivibrator 20 may be varied in any way described, for the particular application shown it is preferable that the other transistor 24 be conducting for a smaller percentage of time than the one transistor 22 over any given cycle. Thus, for a given switching cycle of the multivibrator 20, the switching transistor 16 and the receiver 10 are energized for a small period of time.

In one embodiment actually constructed as shown in

Fig. 1 and satisfactorily operated, the components had the following values:

| | | |
|---|---|---|
| Battery source 12 | volts | 7½ |
| Transistors 16, 22, 24 | | 2N109 |
| Resistors 26, 32 | ohms | 10,000 |
| Resistors 28, 30 | do | 180,000 |
| Capacitor 34 | microfarads | 25 |
| Capacitor 36 | do | 0.4 |
| Bias resistor 38 | ohms | 1000 |

With the circuit arrangement having the values given above, the other transistor 24 of the multivibrator 20 was conducting for approximately 60 milliseconds and was non-conducting for approximately 850 milliseconds, a ratio of approximately 1 to 14. The average current taken by the multivibrator was approximately 1 milliampere, and the average current taken by the receiver 10 was approximately 15 milliamperes. Thus, the average current supplied by the battery was approximately $1+1/14\times15$ or 2.07 milliamperes as opposed to the 15 milliamperes required by the receiver. Thus, a saving of 13 milliamperes was obtained. The bias resistor 38 of approximately 1000 ohms produces a voltage drop in the switching transistor 16 of approximately 0.15 volt, thus permitting almost the entire battery voltage to be applied to the power terminals 11 of the receiver 10. As will be apparent, it is posible to use other types of transistors and other circuit arrangements. However, the embodiment shown in Figure 1 is a preferred embodiment.

As will also be apparent, there are numerous ways of generating the positive D.C. control voltage which is applied to the transistor 22 of the multivibrator 20, or the appropriate control voltage for the particular multivibrator being used. One such way is shown in Figure 2, which shows a conventional receiver represented by the block diagrams showing an oscillator and mixer, intermediate frequency stages, and an output to detector and audio circuits. The control voltage may be derived from a conventional rectifier and filter circuit 40 comprising a capacitor 41 and diode rectifier 42 connected in series, shunt resistors 44, 46, and a shunt capacitor 48. Appropriate carrier signals derived from the intermediate frequency stages of the receiver (when the receiver is energized) are converted into a D.C. control voltage that is positive with respect to the point of reference potential. This positive D.C. control voltage may be applied to the base of the one transistor 22 to render the one transistor 22 nonconductive as described in connection with Figure 1, thus providing continuous energization of the receiver 10. When the carrier signals are removed, the receiver is then intermittently energized again.

Another embodiment for providing an audible tone in addition to a control voltage is shown in Figure 3 which shows the block diagram of a transistor receiver. The receiver comprises a conventional oscillator and mixer, intermediate frequency stages, and a detector circuit and audio amplifier stages. In the receiver shown in Figure 3, it is assumed that the receiver is to be a small, lightweight, portable paging receiver adapted to be carried in the pocket of a person. That is, the receiver is intended to produce an audible tone in response to appropriate carrier signals to indicate to the person carrying the receiver that he is being paged, or that he is to perform some function. This audible tone may be any suitable frequency, for example 1000 cycles. To ensure that no extraneous signals produce the audible tone, a highly selective filter circuit 50 is provided for filtering out all but the desired keying signals. This filter circuit 50 is connected to the audio output stages of the receiver. Keying signals passed by the filter circuit 50 (when the receiver is energized) are applied to an oscillator 51 to key the oscillator 51 on as long as the keying signals are passed. Signals produced by the oscillator 51 in response to being keyed on by the keying signals from the filter circuit 50 are applied to a conventional loudspeaker 52 to produce audible tones and are also applied to a rectifier and filter circuit 40 which is similar to the rectifier and filter circuit 40 shown in Figure 2. When these oscillator signals are applied to the rectifier and filter circuit 40, the rectifier and filter circuit 40 produces the positive D.C. control voltage in the manner described in connection with Figure 2. This positive D.C. control voltage may be applied to the one transistor 22 of the multivibrator 20, thus causing the other transistor 24 to remain in the conducting state. Thus, the receiver 10 is continuously energized. The oscillator signals are also applied to the loudspeaker 52, and will continue to energize the loudspeaker 52 with an audible tone until the person carrying the receiver cuts the loudspeaker 52 off by some suitable means. If desired, the oscillator 51 need not be used, and if the signals from the detector and audio circuit are audible, they may be applied directly to the loudspeaker 52 and to the rectifier and filter circuit 40. However, the oscillator 51 is preferred because its frequency is independent of the frequency used for the highly selective filter circuit 50. Hence the oscillator frequency may be chosen for optimum response of the loudspeaker 52 and the selective filter frequency may be chosen for the optimum response of the filter circuit 50.

Thus, the energizing circuit described provides an efficient means for intermittently energizing a radio receiver, or any load device which is to be intermittently energized. The energizing circuit also provides means for continuously energizing the radio receiver when a predetermined signal is received.

What is claimed is:

1. An energizing arrangement for applying a source of electrical power to a radio receiver, comprising a pair of electron current flow control devices regeneratively connected to form an astable multivibrator in which one of said devices is conducting while the other of said devices is non-conducting, and vice versa, a switching device coupled to one of said control devices for providing an electrical circuit therethru that alternately closes and opens in response to said one of said devices being conducting and non-conducting, means coupled to said receiver for producing a control signal in response to an input signal thereto, means for applying said control signal to said multivibrator to maintain said multivibrator in that condition of operation in which said switching device is caused to be closed, and means for coupling said switching device between said source and said receiver.

2. An energizing circuit for intermittently applying a source of electrical power to a radio receiver, comprising a pair of transistors, capacitors coupled between said pair of transistors to form an astable multivibrator in which the first of said transistors is conducting while the second of said transistors is non-conducting and in which the second of said transistors is conducting while the first of said transistors is non-conducting, terminal means for applying a source of power to said transistors, means for connecting said first and second transistors to said terminal means, a switching transistor for providing an electrical circuit therethru, biasing means coupling said switching transistor to said first transistor so that said switching transistor becomes conducting only when said first transistor is conducting, said switching transistor thus providing an electrical circuit therethru that alternately closes and opens in response to said first transistor being conducting and non-conducting, means for coupling said switching transistor between said source of power and said receiver, means coupled to said receiver for producing a control signal in response to an input signal applied to said receiver, means coupling said last means to said second transistor to maintain said second transistor non-conducting and said first transistor conducting in response to said input signal being applied to said receiver.

3. A battery saver system for a small, portable, lightweight radio receiver which is adapted to be turned on and off automatically at a periodic rate while seeking a signal, comprising a pair of transistors regeneratively connected to form an astable multivibrator in which the first of said transistors is conducting while the second of said transistors is non-conducting and in which the second of said transistors is conducting while the first of said transistors is non-conducting, a switching transistor coupled to said first transistor for providing an electrical circuit therethru that alternately closes and opens in response to said first transistor being conducting and non-conducting, means coupled to said multivibrator for applying a control signal thereto to maintain said switching transistor closed, a source of battery power for energizing said radio receiver, and means for coupling said switching transistor between said source of battery power and said radio receiver.

4. A battery saver system for a small, portable, lightweight radio receiver which is adapted to be turned on and off automatically at a periodic rate while seeking a signal, comprising a pair of electron flow devices regeneratively coupled to form an astable multivibrator in which one of said devices is conducting while the other of said devices is non-conducting, and vice versa, a switching transistor coupled to said one of said electron flow devices and responsive to one electrical condition of operation of said one device for passing current therethrough and to the other electrical condition of said one device for preventing the passage of current therethru, whereby said switching transistor alternately closes and opens, means coupled to said multivibrator for applying a control signal thereto to maintain said switching transistor closed, a source of battery power for energizing said radio receiver, and means for coupling said switching transistor between said source of battery power and said radio receiver.

5. A battery saver system in accordance with claim 4, wherein said one electron flow device of said multivibrator passes current for a smaller percentage of time than said other electron flow device of said multivibrator during the normal operation of said multivibrator.

6. A battery saver system as claimed in claim 4 and wherein said means to apply a control signal to said multivibrator includes a rectifier-filter circuit arrangement connected to a signal responsive circuit in said receiver and responsive to the output of said last-mentioned circuit to produce a direct current control signal for application to said multivibrator.

References Cited in the file of this patent

UNITED STATES PATENTS

| | | |
|---|---|---|
| 2,165,062 | MacKay | July 4, 1939 |
| 2,369,230 | Hansell | Feb. 13, 1945 |
| 2,439,816 | Marshall | Apr. 20, 1948 |
| 2,557,085 | Fisk | June 19, 1951 |
| 2,627,039 | MacWilliams | Jan. 27, 1953 |
| 2,673,936 | Harris | Mar. 30, 1954 |
| 2,838,675 | Wanlass | June 10, 1958 |